No. 672,768. Patented Apr. 23, 1901.
T. W. HINE.
NUT LOCK.
(Application filed Dec. 15, 1900.)

(No Model.)

WITNESSES:
J. A. Baxter
F. D. Fawcett

INVENTOR
Thomas W. Hine
BY
Milo B. Stevens and Co.
ATTORNEYS,

UNITED STATES PATENT OFFICE.

THOMAS W. HINE, OF SCOTCHGROVE, IOWA.

NUT-LOCK.

SPECIFICATION forming part of Letters Patent No. 672,768, dated April 23, 1901.

Application filed December 15, 1900. Serial No. 40,021. (No model.)

*To all whom it may concern:*

Be it known that I, THOMAS W. HINE, a citizen of the United States, residing at Scotchgrove, in the county of Jones and State of Iowa, have invented certain new and useful Improvements in Nut-Locks; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in nut-locks, and particularly to those having two nuts on the bolt; and its objects are to provide a simple and effective fastening for the nuts without the use of washers, keys, pins, or other devices supplemental to the main bolt and nuts, as heretofore used for the purpose, also to provide a nut-lock in the use of which both nuts can be put on the bolt simultaneously and not necessarily singly, as in the devices wherein the bolt has oppositely-threaded screws.

It is also the object of my invention to permit the use of one or both nuts of the common form, although the extent of utility of the bolt may be increased by modification of the outer or locking nut, as will be hereinafter described.

Figure 1:
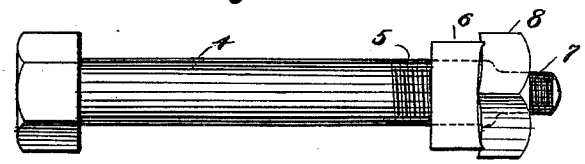
Figure 2:
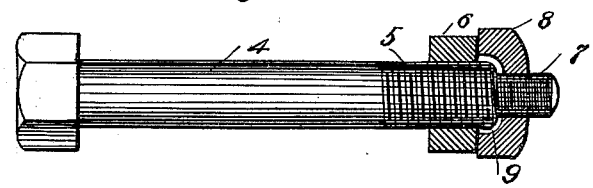
Figure 3:
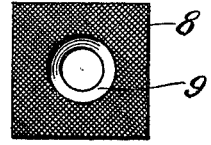

In the accompanying drawings, Figure 1 is a side elevation of my invention. Fig. 2 is a view of the same, showing the bolt in elevation and the nuts in section. Fig. 3 is a plan view of one form of the locking-nut.

The bolt 4 has an inner screw-threaded portion 5, on which fits the inner or holding nut 6, and an outer screw-threaded portion 7 of reduced diameter, on which fits the outer or locking nut 8, which may be countersunk or recessed centrally on its inner face, as shown in the drawings.

The operation of my invention depends mainly upon a difference in pitch of the threads upon the screw-threaded portions of the bolt, the inner portion 5 of larger diameter having a thread of greater pitch and the outer portion 7 of smaller diameter having a thread of lesser pitch. Both threads are cut in the same direction, either right or left handed. The nuts are preferably made of the same diameter and then may be both engaged and turned by a wrench until the inner one is advanced as far as desired, when the wrench is shifted to the outer nut and the same screwed into tight engagement with the inner nut.

It is evident that the inner nut upon a thread of greater pitch cannot turn backward or loosen while engaged by the outer nut, also that the two nuts cannot turn together to be unscrewed, also that the frictional engagement between the opposing faces of the two nuts effectively prevents loosening or unscrewing of the outer nut by tending to cause both nuts to turn together, which has the effect, owing to the greater pitch of the threads of the inner nut, of locking the nuts more securely together.

When the portions of the bolt are oppositely threaded, as in many lock-nuts heretofore designed, the nuts normally tend to loosen and separate unless prevented by pins, engaging teeth, and such devices heretofore employed, while in my invention when the nuts have been tightened together the loosening tendency has the effect of binding them together more securely. The tendency of the inner nut to move with the outer one, owing to the friction between them, increases with the wrenching force applied to the outer nut, because of the difference in their relative rate of longitudinal movement on the bolt. To unlock and remove the nuts, it is necessary to hold the inner nut against movement with one wrench and turn the outer nut with another.

To assist the frictional engagement between the nuts, one or both of the engaging faces may be roughened or ridged, as illustrated in Fig. 3, or slightly concaved, as shown greatly exaggerated in Fig. 1, in which latter case the edges of the engaging faces of the nuts cut or bite into each other. Practically I find that the slight concavity of the inner face or the roughening and slight projection of the edges of the inner face caused by the shear of the die in the ordinary method of stamping or cutting nuts is sufficient to accomplish the effect indicated.

The countersink or recess 9 permits of a greater range of adjustability, in that the nut 8 can pass inwardly over the shoulder formed by the reduced portion of the bolt; but it will be seen that the counter sink is not essential to the operation of my device when the outer face of the nut 6 extends outwardly beyond the shoulder formed by the reduced portion of the bolt.

Having thus described my invention, what I claim as new, and desire to secure by Letters Patent, is—

1. In combination, a bolt having an inner portion screw-threaded, an outer portion of reduced diameter screw-threaded in the same direction with threads of lesser pitch, nuts fitting each portion and having slightly-concave faces adapted to enter into locking engagement with each other by means of the projecting corners on each nut which, when the nuts are brought together, extend over and engage the edge of the other nut.

2. In combination, a bolt having an inner portion screw-threaded, an outer portion of reduced diameter screw-threaded in the same direction with threads of lesser pitch, nuts fitting each portion and adapted to enter into locking engagement with each other by means of slightly-projecting corners on each nut which, when the nuts are brought together, extend over and engage the edge of the other nut.

3. In combination, a bolt having an inner portion screw-threaded, an outer portion of reduced diameter screw-threaded in the same direction with threads of lesser pitch, nuts fitting each portion and engageable with each other the engaging face of each nut having ridges and having slightly-projecting corners which, when the nuts are brought together, extend over and engage the edge of the other nut.

4. In combination, a bolt having an inner portion screw-threaded in one direction, an outer portion of reduced diameter screw-threaded in the same direction with threads of lesser pitch, a nut fitting the inner portion, and a nut fitting the outer portion having a central recess or countersink enabling it to engage with the other nut over the shoulder formed by the reduced portion of the bolt, the engaging face of each nut having slightly-projecting corners which, when the nuts are brought together, extend over and engage the edge of the other nut.

In testimony whereof I affix my signature in presence of two witnesses.

THOMAS W. HINE.

Witnesses:
GEORGE E. TEW,
W. J. ROBINSON.